Dec. 20, 1927.

W. H. OGDEN 1,653,407

SELF ADJUSTING BEARING

Filed Nov. 23, 1926     2 Sheets-Sheet 1

Inventor
W. H. OGDEN,

By
L. G. Quesada
Attorney

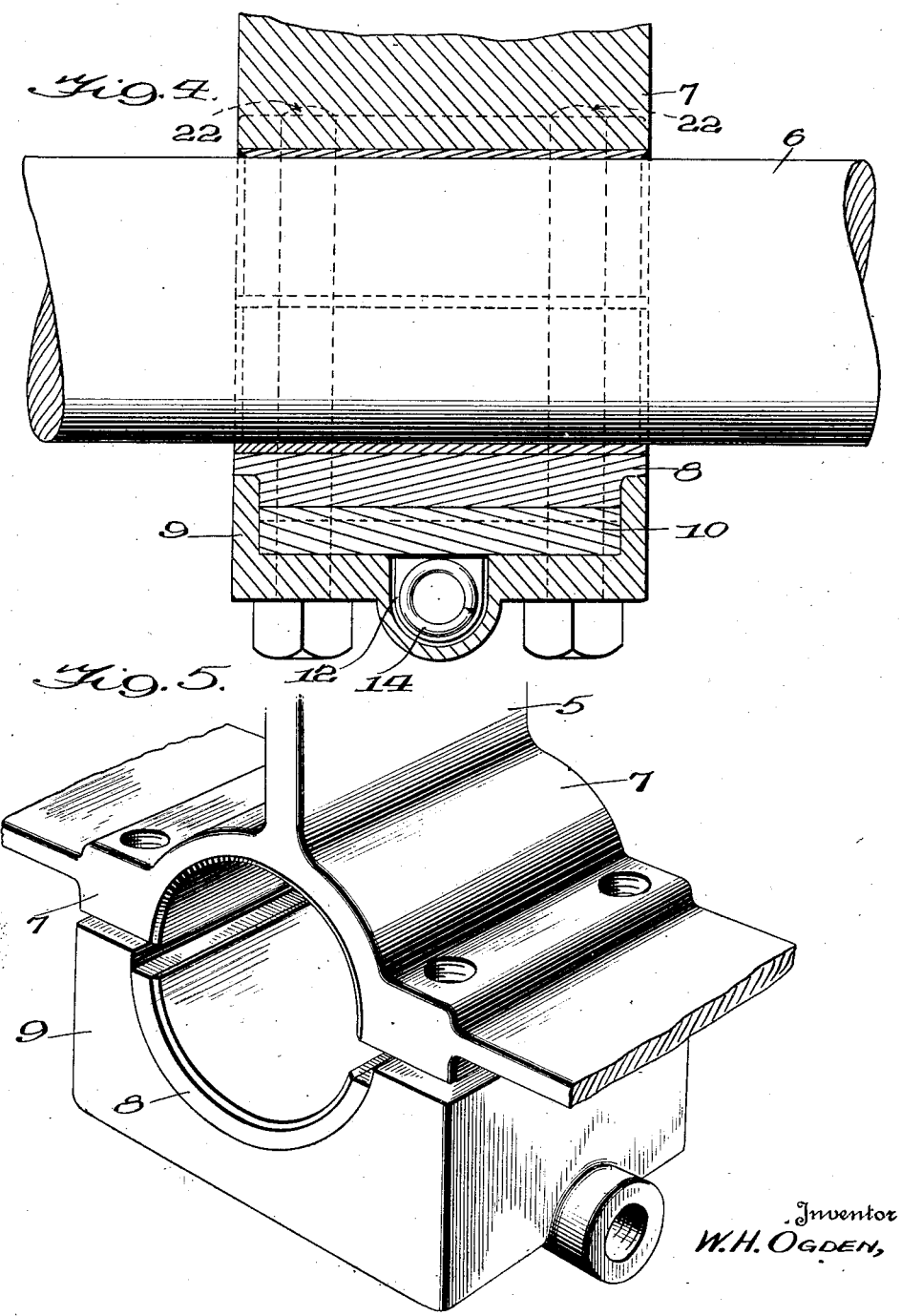

Patented Dec. 20, 1927.

1,653,407

UNITED STATES PATENT OFFICE.

WARD H. OGDEN, OF KEYSTONE HEIGHTS, FLORIDA.

SELF-ADJUSTING BEARING.

Application filed November 23, 1926. Serial No. 150,318.

This invention relates to bearings especially adapted for use in internal combustion engines, although not in any sense restricted to such use.

An important aim is to provide a sectional bearing having means by which wear is automatically compensated for to avoid the necessity of detaching the oil pan of the engine and separately adjusting each bearing to the required degree of tightness at intervals.

A further object is to provide a sectional bearing in which simple means are provided to support a transversely movable wedge and to urge the same into pressure engagement with one of the sections of the bearing.

A further and equally important object of the invention is to provide a bearing of the character specified which is of highly simplified construction, durable in use and cheap to manufacture and which may be incorporated in an internal combustion or other engine without a substantial departure from established practice.

Other objects and advantages will be apparent during the course of the following description.

In the accompanying drawing forming a part of this application and in which like numerals are employed to designate like parts throughout the same, Figure 1 is a vertical transverse sectional view through a bearing constructed in accordance with the invention, the view being taken on line 1—1 of Figure 2.

Figure 4 is a vertical transverse section taken at right angles to Figure 1.

Figure 5 is a group perspective of the bearing.

Figure 1:
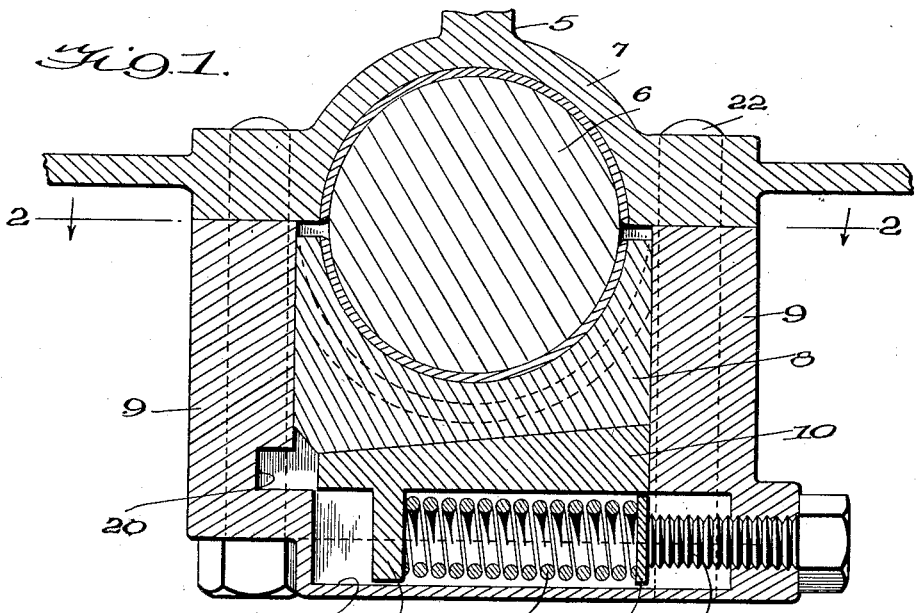
Figure 2:
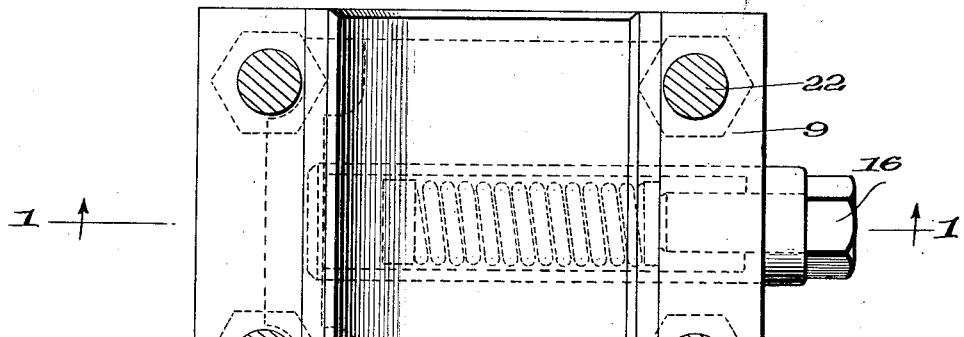
Figure 2 is a horizontal sectional view taken on line 2—2 of Figure 1.

In the drawing wherein for the purpose of illustration is shown a preferred embodiment of the invention the numeral 5 might be said to be applied to a portion of the crank case of an internal combustion engine. However, as previously suggested the invention is not in any sense restricted to such use, although its greatest utility may be found in such engines.

The numeral 6 designates a main bearing encircled by the fixed and detachable sections 7 and 8 respectively of the main bearing. Of course a babbitt or other lining is located between the shaft and the bearing for the obvious purpose of reducing friction to a minimum. Figure 1 clearly illustrates that the sections of the bearing are normally spaced from each other to permit the section to be drawn together as a result of wear. No shims are placed between the sections of the bearing as customary as the section 8 is urged into pressure contact with the crank shaft at all times by means to be described and the employment of such shims would limit the extent to which the sections may be drawn together.

In carrying out the invention the section or block 8 is positioned between and has sliding contact with the parallel sides 9 of a main bearing cap of U-shaped formation. The U-shaped formation of the main bearing cap is an important feature of the invention as the bight portion of the U-shaped cap serves as a rest or support for a transversely movable wedge 10, the upper side of which is tilted or inclined in a direction opposite the inclination of the underside of the block 8 so that transverse movement of the wedge 10 will result in the movement of the block 8 in the direction of the shaft 6 to compensate for wear.

The sliding contact of the opposed surfaces of the section 8 and the sides 9 holds the section 8 in proper position at all times and avoids canting and possible binding of the same. Also the line of thrust on the section 8 from the wedge 10 is at right-angles to the vertical plane of the crank shaft and this fact, coupled with the generous area of contact between the wedge and the section 8 assures uniform pressure contact of the block 8 with the crank shaft so that uneven wear is avoided.

The under side of the transversely movable wedge 10 is provided with a depending substantially semi-circular lug 12 engaged by one end of an expansion spring 14. The other end of the spring is engaged by a disk 15 forced inwardly by a set screw 16. The lug 12, the spring 14, the disk 15 and the shank of the set or cap screw 16 are positioned in a channel 18 formed in the bight portion of the bearing cap. The channel 18 may be substantially semi-circular in cross section and is of a width to snugly receive the spring 14, the lug 12 and the disk 15 so that lateral movement of these parts and especially buckling of the spring is inhibited. In other words, the positioning of the lug 12, the spring 14, the disk 15 and the shank of the cap or set screw 16 in the channel holds these parts accurately in line so that the spring will urge the wedge 10 transversely and thereby compensate for wear. Figures 1 and 4 illustrate that the channel 18 is formed within a strengthening and reinforcing rib extending across the bottom of the U-shaped cap.

Figure 3:
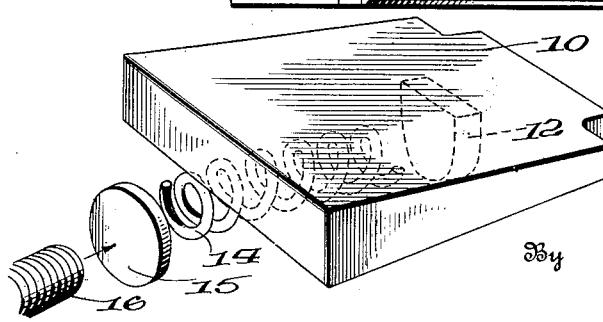
Figure 3 is a group perspective illustrating a wedge and the means to urge the same into pressure contact with one of the bearing blocks.

Particular attention is directed to the fact that the wedge 10 is of a length less than the distance between the sides 8 and that the wedge is movable on the bight portion of the cap so that the same is firmly braced for pressure contact with the block. Figure 3 illustrates in an admirable manner the fact that one end of the wedge 10 is reduced so that the same may be extended into a socket 20 in one of the sides 9 when the wedge approaches or reaches its most advanced position.

In assembling the bearing the section 8 is first extended over the crank shaft in the customary manner and the cap of U-shaped formation is applied and secured in place by cap screws 22, of which there may be four or any desired number. Subsequent to the securing of the cap in place the set screw 16 is advanced, preferably to the position illustrated to force the wedge transversely into pressure contact with the section 8. The advancement of the set screw 16 will result in the compression of the spring 14 so that as wear takes place the spring will expand and advance the wedge and thereby move the section 8 upwardly.

The improved bearing provides a simple means by which the necessity of occasionally dropping the oil pan of the engine and adjusting the main bearings is avoided. Furthermore there is no reason why the invention may not be carried out equally as well in connection with the bearings of pitman rods of steam engines or the connecting rods of internal combustion engines. It is therefore to be understood that the form of invention herein shown and described is to be taken merely as a preferred example of the same and that such minor changes in arrangement and construction of parts may be made as will remain within the spirit of the invention and the scope of what is claimed.

Having thus described the invention, what is claimed is:

1. The combination of a bearing block, a wedge movable transversely thereof and having a lug, a cap slidably supporting said wedge and having a channel receiving said lug, and a spring in said channel and having pressure contact with said lug.

2. The combination of a bearing block, a wedge movable transversely thereof and having a lug, a cap slidably supporting said wedge and having a channel receiving said lug, a spring in said channel and having pressure contact with said lug, and a set screw for tensioning the said spring.

3. The combination of a bearing block, a wedge movable transversely thereof and having a lug, a cap slidably supporting said wedge and having a channel receiving said lug, a spring in said channel and having pressure contact with said lug, and a set screw for compressing said spring, the side walls of said channel being adapted to hold said lug and said spring in line with said set screw.

4. The combination of a bearing block, a wedge flatly engaging the major portion of one surface of the block, said wedge being provided with a depending lug, a U-shaped cap having a bight portion movably supporting said wedge and being provided between the sides thereof with a hollow rib defining a channel for the reception of said lug, an expansion spring in said channel and engaged with said lug, and a set screw for tensioning said spring.

5. The combination of a bearing block, a wedge engaging one surface of the block, said wedge being provided with a lug, a U-shaped cap having a bight portion movably supporting said wedge and being provided with a hollow strengthening rib defining a channel for the reception of said lug, a spring in said channel and engaged with said lug, and a set screw tensioning said spring, said U-shaped cap being provided with parallel sides with which the sides of said block have sliding contact.

6. The combination of a bearing block, a wedge for the block and having a lug, a cap slidably supporting said wedge and having a channel receiving said lug, said cap also being provided with substantially parallel walls with which the wedge is engaged and guided by, a spring in said channel and having pressure engagement with said lug, tightening means for said spring, and a contact member between said spring and said tightening means, said channel constituting a means to hold said spring approximately in line between said lug and said tightening means.

In testimony whereof I affix my signature.

WARD H. OGDEN.